(12) United States Patent
Parker et al.

(10) Patent No.: US 6,810,480 B1
(45) Date of Patent: Oct. 26, 2004

(54) VERIFICATION OF IDENTITY AND CONTINUED PRESENCE OF COMPUTER USERS

(75) Inventors: Benjamin J. Parker, Overland Park, KS (US); Shane R. Werner, Olathe, KS (US); Terry M. Frederick, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 25 days.

(21) Appl. No.: 10/274,934

(22) Filed: Oct. 21, 2002

(51) Int. Cl.$^7$ .............................................. G06F 1/24
(52) U.S. Cl. ..................... 713/186; 713/168; 713/182
(58) Field of Search .............................. 713/186, 168, 713/182

(56) References Cited

U.S. PATENT DOCUMENTS

| | | | |
|---|---|---|---|
| 5,229,764 A | | 7/1993 | Matchett et al. |
| 6,160,903 A | * | 12/2000 | Hamid et al. ............... 382/115 |
| 6,163,616 A | | 12/2000 | Feldman |
| 6,259,805 B1 | * | 7/2001 | Freedman et al. .......... 382/124 |

OTHER PUBLICATIONS

Andrew J. Klosterman and Gregory R. Ganger, *Secure Continuous Biometric–Enhanced Authentication*, May, 2000.

Gregory R. Ganger, *Authentication Confidences*, Apr., 2001.

* cited by examiner

*Primary Examiner*—Thomas R. Peeso

(57) ABSTRACT

The identity and continued presence of an individual at a computer workstation are verified prior to and during execution of an application on the computer workstation. A first biometric sample of an individual proximate to the workstation is gathered at a first time. A first identity is established corresponding to the first biometric sample using a first biometric comparison, wherein the first biometric comparison consumes a first processing load. The application is executed in conjunction with the first identity. A second biometric sample of an individual proximate to the workstation is gathered at a second time following the first time by a delay. A second identity is established corresponding to the second biometric sample using a second biometric comparison, wherein the second biometric comparison consumes a second processing load which is less than the first processing load. The application conditionally continues to execute in conjunction with the first identity if the second identity matches. In another embodiment, the difference between the first and second biometric comparisons is that the first requires a dedicated, cooperative action while the second does not.

17 Claims, 3 Drawing Sheets

VERIFICATION OF IDENTITY AND CONTINUED PRESENCE OF COMPUTER USERS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to biometric identification of users of computerized workstations, and, more specifically, to continuous monitoring of a user's identity while consuming a reduced level of computer processing resources.

Biometric authentication involves the use of physical and/or behavioral characteristics of individuals to identify them and to control access to places or things, such as ATM's or other computerized equipment or specific applications running on that equipment. Biometrics has certain advantages over conventional authentication techniques (e.g., user IDs and passwords, PIN codes, and encoded identification cards) since there is nothing to remember or to carry which might be stolen. Based on an original measurement of a biometric characteristic (i.e., enrollment), a person's identity can thereafter be verified automatically when accessing a resource by re-sampling the characteristic and comparing the biometric data with the enrollment data. If a sufficiently close match is found, then the identity is verified. In addition to verification of an identity, biometric systems can also be employed to compare biometric data from an unidentified person with a database of biometric samples of a group of individuals in order to identify that person from the group.

After a biometric sensor acquires raw data of a desired characteristic, the data is typically processed mathematically in order to extract and format the meaningful features and to compress the data. Comparison of the processed verification or identification data with previously processed and stored enrollment data typically involves a mathematical analysis to quantify the "closeness" of the two data samples. A sensitivity threshold is chosen to delineate how close the samples must be in order to call them a match.

When an identification error occurs, it can be either a false acceptance (i.e., false positive) or a false rejection (i.e., false negative). A false acceptance rate (FAR) and a false rejection rate (FRR) are defined as the percentage at which these error occur for a given biometric system. By varying the sensitivity, it is possible to reduce one of the error rates, but the improvement comes at the expense of increasing the other error rate. Consequently, a crossover error rate (CER) has been defined as the error rate obtained when the sensitivity is adjusted such that the FAR and FRR are equal. The lower the CER, the better the accuracy of a biometric system.

Among the many biometric technologies that have become available are fingerprint analysis, hand geometry analysis, retina scanning, iris scanning, signature analysis, facial recognition, keystroke analysis, and voice analysis. Biometric authentication can be applied for security/access control in a wide variety of applications, some of which require only an initial authentication in granting access and others which use repeated, substantially continuous re-authentication during the time that access is granted. For example, in distance learning applications, a student accesses a teaching program using a networked computer to view live or recorded lectures and class materials. Especially when a test is given, it is necessary to verify that the person taking the test is the proper one and that the proper person stays in place at the computer workstation while the test is being taken.

Because of the computationally intensive nature of biometric identification, a more accurate biometric identification system tends to require more computer processing resources that a less accurate system. Computer processing resources may include computer CPU time, computer memory space, and operating system overhead on the user's computer system as well as network traffic volume and CPU time, memory, and system overhead on network servers when implemented using a network (e.g., the Internet). When continuous or repeated identity verifications are conducted, the total processing load may become quite large because of the re-sampling, processing, and matching analysis that is required. Depending upon the processing capabilities of the particular computer workstation, both the biometric operations and the protected application itself may suffer from degraded performance thereby disrupting the intended system utilization.

Some biometric systems require a deliberate, cooperative action to be taken by a subject in order to collect biometric sample data (e.g., placing a finger on an imager, looking into a camera, or writing on a touch pad). While such a required action is acceptable for a one-time authentication is may not be acceptable because of the disruption it would cause if continuous or repeated authentications are being used, such as in a distance learning application.

SUMMARY OF THE INVENTION

The present invention provides advantages of increased convenience and reduced load on processing resources in a continuous or repeated biometric authentication system. Two distinct biometric comparisons are used, wherein a first biometric is adapted for providing an initial identification of a user at the beginning of a session on a protected computer application and a second biometric verifies the continued presence of the same user.

In one aspect of the present invention, a method is provided for verifying an identity and a continued presence of an individual at a computer workstation during execution of an application on the computer workstation. A first biometric sample of an individual proximate to the workstation is gathered at a first time. A first identity is established corresponding to the first biometric sample using a first biometric comparison, wherein the first biometric comparison consumes a first processing load. The application is executed in conjunction with the first identity. A second biometric sample of an individual proximate to the workstation is gathered at a second time following the first time by a delay. A second identity is established corresponding to the second biometric sample using a second biometric comparison, wherein the second biometric comparison consumes a second processing load which is less than the first processing load. The application conditionally continues to execute in conjunction with the first identity if the second identity matches. In another embodiment, the difference between the first and second biometric comparisons is that the first requires a dedicated, cooperative action while the second does not.

DETAILED DESCRIPTION OF PREFERRED EMBODIMENTS

Figure 1:
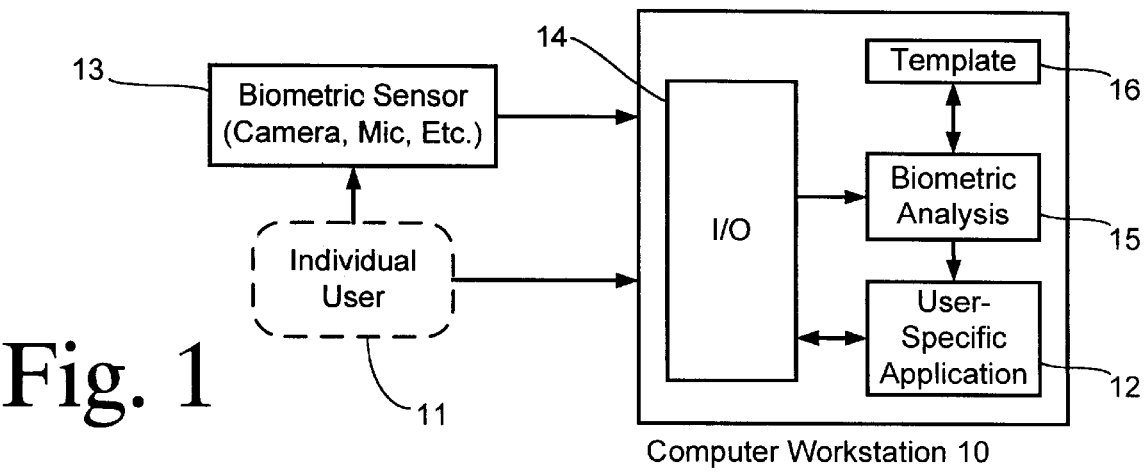
FIG. 1 is a block diagram of a computer workstation including a biometric identification system for protecting a user-specific application in the manner of the present invention.

Referring to FIG. 1, a computer workstation 10 is used by an individual user 11 to access a user-specific application 12, such as a distance learning application, an electronic commerce application (e.g., online banking), or any other computer or network application requiring continuous or repeated authentication. Workstation 10 may be a general purpose minicomputer with appropriate hardware or may be a dedicated device such as a computer conferencing station or an automated teller machine (ATM), for example. Operation may be self-contained as shown on workstation 10 or may include network connections to remote computerized equipment for performing functions related to user-specific application 12 and/or the biometric analysis itself. A biometric sensor 13 may be a separate device or may be integrated with workstation 10 and is adapted to collect one or more types of biometric data from user 11. Sensor 13 may comprise a camera or solid state imaging device for collecting facial, retina, iris, or fingerprint data, a microphone for collecting voice data, and/or a touch-sensitive pad for collecting signature or hand profile data, for example. Sensor 13 may also include a computer keyboard associated with workstation 10 when keystroke analysis is used.

An input/output interface 14 couples the biometric raw data from sensor 13 to a biometric analysis block 15 which also receives at least a pair of biometric templates from a template memory 16. Each template corresponds to the enrollment data of user 11 for a respective biometric comparison. In one embodiment, a first comparison establishes an identity of user 11 while consuming a first processing load. Since accuracy of the initial authentication of an individual may be more important for security purposes and since demand by the protected application for processing resources may be low prior to initial authentication, a more computationally intensive and accurate biometric comparison consuming relatively more processing power is used. For repeated re-authentication of the user during continued use of the protected application, a second biometric comparison is used which consumes a second processing load which is less than the first processing load. The reduced processing load of the second biometric typically means that it will be less accurate, but less accuracy is acceptable for the ongoing re-authentication since only a substitution of another individual needs to be detected.

Figure 2:
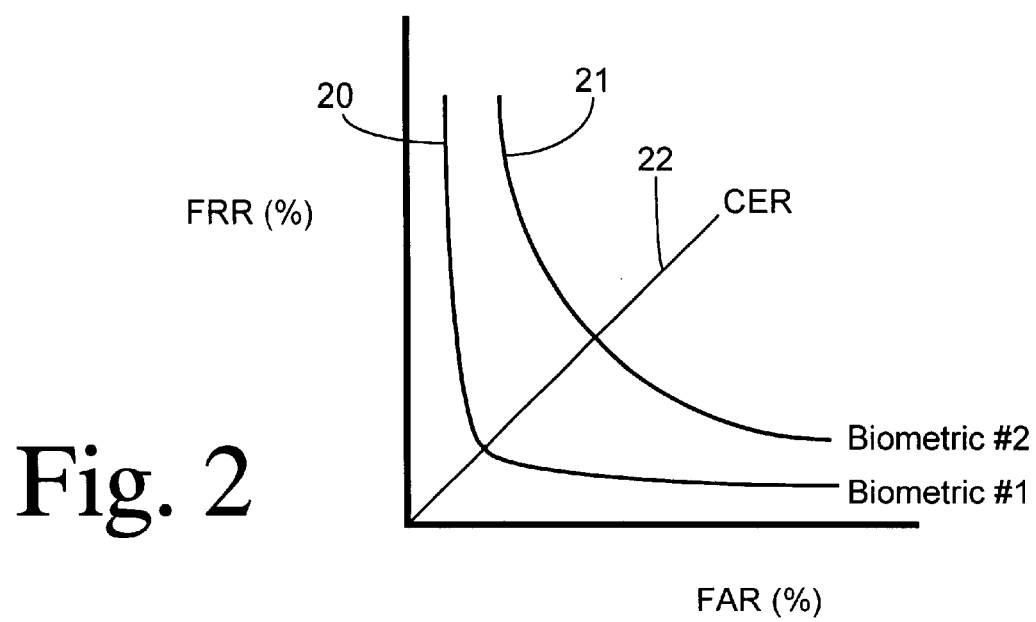
FIG. 2 is a plot showing crossover error rate for two different biometric identification methods.
Figure 3:
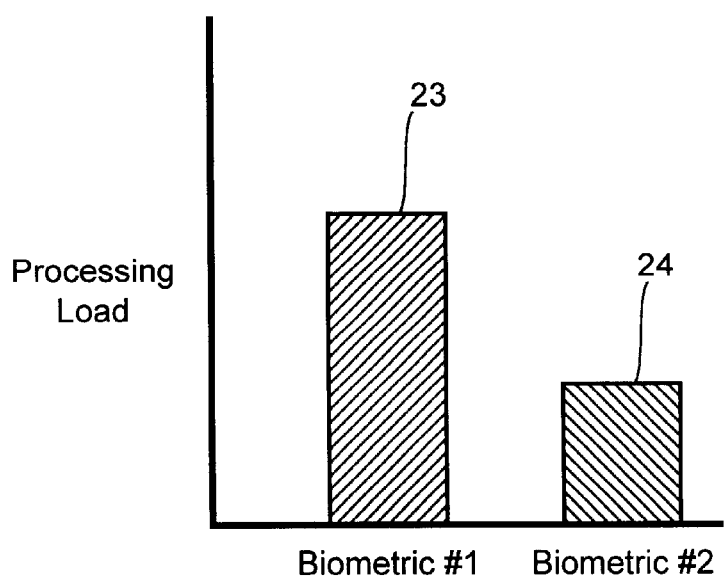
FIG. 3 is a bar chart showing relative processing loads for the two biometric identification methods.

Relative accuracy of biometric identification methods is shown in FIG. 2. A curve 20 corresponds to a plot of the FRR and the FAR obtained for various sensitivity settings for a first biometric #1 and a curve 21 corresponds to a plot of the FRR and the FAR obtained for various sensitivity settings for a second biometric #2. The CER of each biometric occurs at the intersection of curves 20 and 21 with a CER line 22 where FFR=FAR. As shown in FIG. 3, an increase in accuracy (i.e., a lower CER) typically corresponds to an increased processing load. Thus, first biometric #1 consumes a processing load 23 which is relatively greater than a processing load 24 of second biometric #2.

The present invention is useful with any combination of different biometric comparison methods. In a preferred embodiment, the first biometric comparison is selected from a first group comprising fingerprint analysis, hand geometry analysis, retina scan analysis, and signature analysis and the second biometric comparison is selected from a second group comprising facial recognition, keystroke analysis, iris scan analysis, and voice analysis, although any of the methods could be selected for either the first or second comparisons since each general method can be implemented in various ways which require more or less processing power. In general, however, the biometric methods in, the first group typically require dedicated cooperative action by the user and have higher processing load requirements. The biometric methods in the second group can typically be conducted non-invasively and with lower processing load requirements.

The same overall biometric could also be used for both detections, with the first detection using a more complex processing algorithm or using higher resolution data, for example. Thus, a facial identification using a higher resolution data sample (e.g., a picture captured from a camera) is used as the first biometric comparison (with more reference points being compared). The subsequent repeated identifications are then performed in the second biometric comparison using a facial identification with a lower resolution data sample to be compared with enrollment data also at the lower resolution.

Independent of the actual CER's of the two different biometric comparisons, the sensitivity of the second biometric comparison can be manipulated to reduce the occurrence of false rejections (i.e., lowering the accuracy) since the user would have already been authenticated by a more rigorous biometric comparison.

When processing load is not a concern, the present invention also contemplates selecting the first and second biometrics according to whether dedicated cooperative actions must be taken by the user. In a distance learning application, for example, it would be undesirable to require the user to take attention away from a class lecture or from test taking in order to give a re-authentication sample. Thus, in this embodiment, the first biometric requires a dedicated cooperative action for collecting biometric data while the second biometric collects the needed biometric data non-invasively (e.g., using a camera to collect a facial picture or a keyboard for keystroke analysis). Employing as raw biometric data the user actions that go along with using the user-specific application (e.g., typing on the keyboard to enter test answers or speaking into a microphone to converse with a remote person) are considered as non-invasive methods herein.

Figure 4:
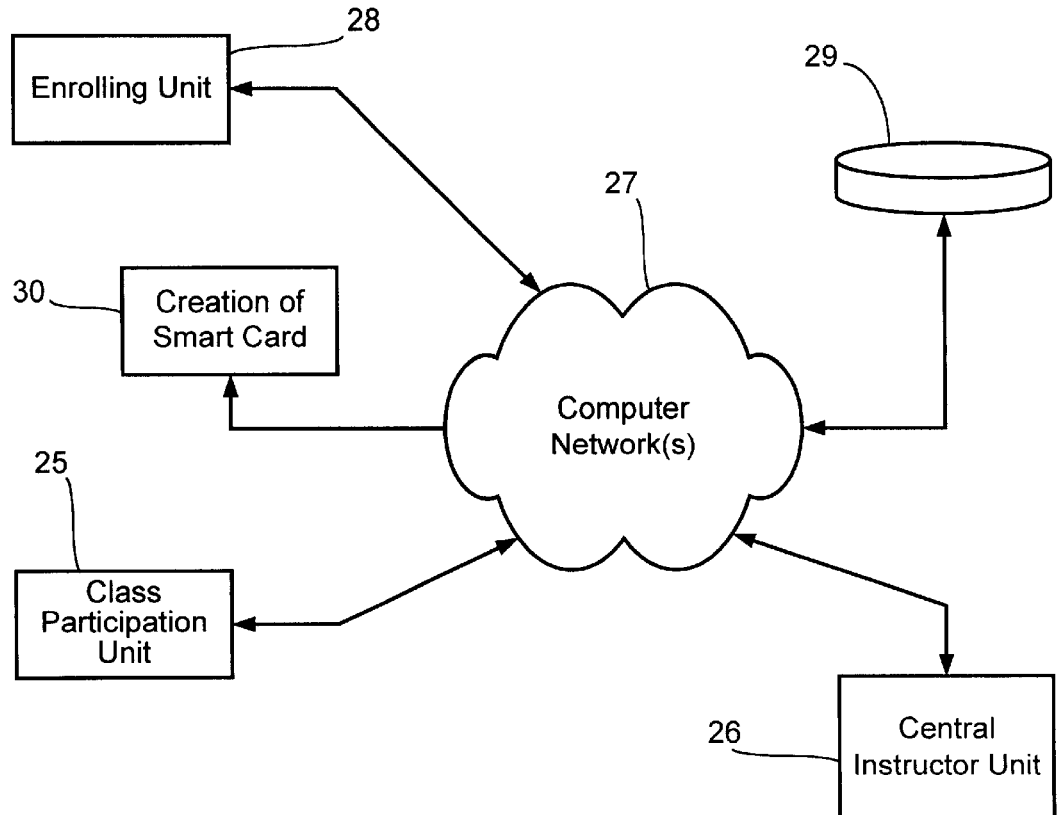
FIG. 4 is a block diagram showing a distance learning system according to the present invention.

A distance learning system of the present invention is shown in FIG. 4. A class participation unit 25 used by a student may comprise a computer workstation as described above. A central instructor unit 26 may comprise a general purpose computer and video camera for capturing and transmitting live presentations of an instructor or may comprise a server for prerecorded materials, for example. Units 25 and 26 are coupled via a computer network 27 which may be a private network (e.g., an enterprise or campus network)

or a public network (e.g., the Internet). Biometric templates for registered students may be collected from participation unit 25 or from a separate enrolling unit 28. The templates can be stored in a standalone database 29 coupled to network 27 or even in participation unit 25, for example. Due to privacy concerns over collections of personal biometric data, the biometric templates can instead be stored on a personal media such as by creation of a smart card 30 which can be read by the computer workstation (with appropriate hardware) to obtain the biometric templates for the corresponding individual.

Figure 5:
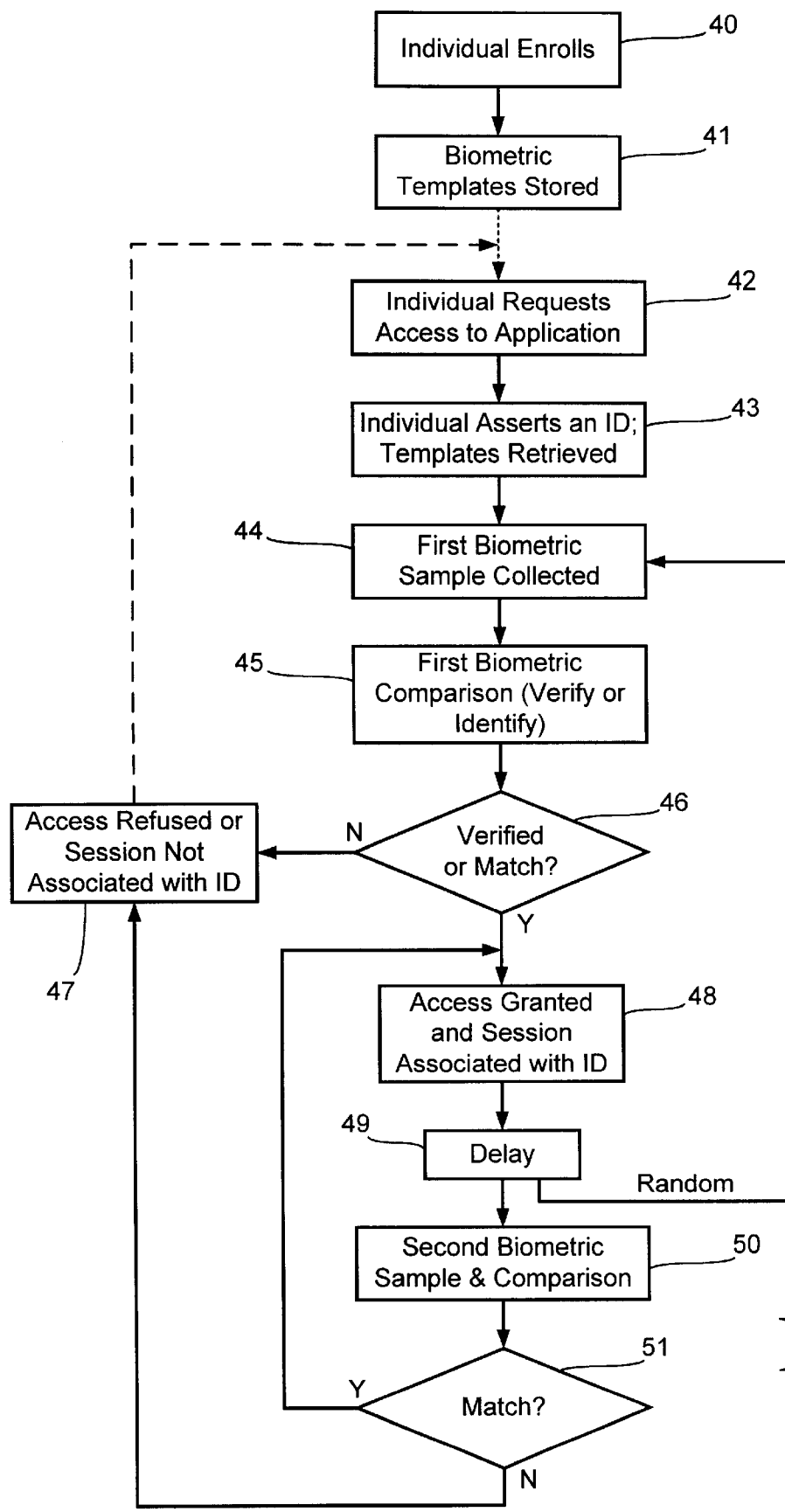
FIG. 5 is a flowchart of a preferred method of the invention.

One preferred method of the present invention is shown in FIG. 5. An individual (e.g., a student registering for a distance learning class) enrolls their biometric data in step 40 according to the first and second biometric comparisons to be utilized. Raw data from the enrollment is processed and stored as biometric templates in step 41. The templates are associated with an identity of the enrolling person (e.g., in a network database or loaded into a smart card to be carried by the person).

After enrollment, actual use of the protected system can begin. In step 42, the individual approaches the computer workstation containing the user-specific application (i.e., an application requiring authentication) and requests access to the application (e.g., by launching a program to join a distance learning lecture session or a test session). In step 43, the individual asserts their identity for verification, such as by typing their name or other ID or by presenting a smart card to a smart card reader which retrieves the name or ID automatically. Based on the name or ID, the corresponding biometric templates are retrieved from the template database or are retrieved from the smart card itself. In an alternative embodiment, the assertion of an identity can be skipped and a direct biometric identification can be performed via the first biometric comparison rather than the verification as shown in FIG. 5. In that alternative embodiment, the entire group of biometric templates would be accessed.

In step 44, a first biometric sample is collected (either with or without dedicated cooperative action by the individual depending upon the biometric technology being employed). The sample is processed and then the first biometric comparison is performed in step 45. The result of the first biometric comparison is checked in step 46. If the asserted identity is not verified (or if no match is found when attempting a biometric identification), then access is denied in step 47. Alternatively, an anonymous session (i.e., not associated with a particular ID) might be allowed in step 47 depending upon the application.

After initial authentication in step 46 (i.e., the first identity has been verified or matched), access to the protected application is granted in step 48 and the subsequent user session (e.g., the taking of a test) is associated with the first identity. After a fixed or random delay 49, the user is re-authenticated in step 50 using a second biometric sample and second biometric comparison according to either a reduced process load or a biometric method that does not employ a dedicated cooperative action when collecting the sample. A check is made in step 51 to determine whether the individual then present at the workstation (i.e., whether the verified identification from the second biometric comparison) is the same as the first identity from the first biometric comparison. If the identity matches, then a return is made to step 48 so that access to the user-specific application continues on a conditional basis as long as successful biometric identifications continue to be performed. If there is no longer a match, then further access is refused in step 47.

To further improve the confidence in the identification of the individual, the first biometric which is more processor intensive and/or requires dedicated cooperative action can be randomly performed during the re-authentications. Thus, after the delay in step 49 the method may randomly branch back to step 44 (the first biometric comparison) rather than to step 50 (the second biometric comparison).

What is claimed is:

1. A method of verifying an identity and a continued presence of an individual at a computer workstation during execution of an application on said computer workstation, said method comprising the steps of:

gathering a first biometric sample of an individual proximate to said workstation at a first time;

establishing a first identity corresponding to said first biometric sample using a first biometric comparison, wherein said first biometric comparison consumes a first processing load;

executing said application in conjunction with said first identity;

gathering a second biometric sample of an individual proximate to said workstation at a second time following said first time by a delay;

establishing a second identity corresponding to said second biometric sample using a second biometric comparison, wherein said second biometric comparison consumes a second processing load which is less than said first processing load; and conditionally continuing to execute said application in conjunction with said first identity if said second identity matches.

2. The method of claim 1 further comprising the successive repetition of the following steps, wherein said successive repetitions occur at a first frequency:

gathering a subsequent second biometric sample of an individual proximate to said workstation at a subsequent time;

establishing a subsequent identity corresponding to said respective subsequent second biometric sample using said second biometric comparison; and conditionally continuing to execute said application in conjunction with said first identity if said respective subsequent identity matches.

3. The method of claim 2 further comprising the successive repetition of the following steps, wherein said successive repetitions occur at a second frequency lower than said first frequency:

gathering a subsequent first biometric sample of an individual proximate to said workstation at a subsequent time;

establishing a subsequent identity corresponding to said respective subsequent first biometric sample using said first biometric comparison; and conditionally continuing to execute said application in conjunction with said first identity if said respective subsequent identity matches.

4. The method of claim 3 wherein said subsequent first biometric samples are gathered at random intervals.

5. The method of claim 1 wherein said first biometric comparison is selected from a group comprising fingerprint analysis, hand geometry analysis, retina scan analysis, and signature analysis.

6. The method of claim 1 wherein said second biometric comparison is selected from a group comprising facial recognition, keystroke analysis, iris scan analysis, and voice analysis.

7. A method of verifying an identity and a continued presence of an individual at a computer workstation during execution of an application on said computer workstation, said method comprising the steps of:

gathering a first biometric sample of an individual proximate to said workstation at a first time, wherein gathering of said first biometric sample requires a dedicated cooperative action to be taken by said proximate individual;

establishing a first identity corresponding to said first biometric sample using a first biometric comparison;

executing said application in conjunction with said first identity;

gathering a second biometric sample of an individual proximate to said workstation at a second time following said first time by a delay, wherein gathering of said second biometric sample is gathered without any dedicated cooperative action taken by said proximate individual;

establishing a second identity corresponding to said second biometric sample using a second biometric comparison; and conditionally continuing to execute said application in conjunction with said first identity if said second identity matches.

8. The method of claim 7 further comprising the successive repetition of the following steps, wherein said successive repetitions occur at a first frequency:

gathering a subsequent second biometric sample of an individual proximate to said workstation at a subsequent time without any dedicated cooperative action taken by said proximate individual;

establishing a subsequent identity corresponding to said respective subsequent second biometric sample using said second biometric comparison; and conditionally continuing to execute said application in conjunction with said first identity if said respective subsequent identity matches.

9. The method of claim 8 further comprising the successive repetition of the following steps, wherein said successive repetitions occur at a second frequency lower than said first frequency:

gathering a subsequent first biometric sample of an individual proximate to said workstation at a subsequent time, requiring a dedicated cooperative action to be taken by said proximate individual;

establishing a subsequent identity corresponding to said respective subsequent first biometric sample using said first biometric comparison; and conditionally continuing to execute said application in conjunction with said first identity if said respective subsequent identity matches.

10. The method of claim 9 wherein said subsequent first biometric samples are gathered at random intervals.

11. The method of claim 7 wherein said first biometric comparison is selected from a group comprising fingerprint analysis, hand geometry analysis, retina scan analysis, and signature analysis.

12. The method of claim 7 wherein said second biometric comparison is selected from a group comprising facial recognition, keystroke analysis, iris scan analysis, and voice analysis.

13. A method of verifying an identity and a continued presence of an individual at a computer workstation during execution of an application on said computer workstation, said method comprising the steps of:

gathering a first biometric sample of an individual proximate to said workstation at a first time;

establishing a first identity corresponding to said first biometric sample using a first biometric comparison, wherein said first biometric comparison is characterized by a first crossover error rate;

executing said application in conjunction with said first identity;

gathering a second biometric sample of an individual proximate to said workstation at a second time following said first time by a delay;

establishing a second identity corresponding to said second biometric sample using a second biometric comparison, wherein said second biometric comparison is characterized by a second crossover error rate, and wherein said first crossover error rate is lower than said second crossover error rate; and conditionally continuing to execute said application in conjunction with said first identity if said second identity matches.

14. The method of claim 13 wherein said first and second biometric comparisons are made using first and second sensitivity settings, respectively, and wherein said first and second sensitivity settings result in first and second false-acceptance rates, respectively, such that said first false-acceptance rate is lower than said second false-acceptance rate.

15. The method of claim 13 wherein said first and second biometric comparisons are made using first and second sensitivity settings, respectively, and wherein said first and second sensitivity settings result in first and second false-rejection rates, respectively, such that said second false-rejection rate is lower than said first false-rejection rate.

16. A method of verifying an identity and a continued presence of an individual at a computer workstation during execution of an application on said computer workstation, said method comprising the steps of:

gathering a first biometric sample of an individual proximate to said workstation at a first time;

establishing a first identity corresponding to said first biometric sample using a first biometric comparison, wherein said first biometric comparison consumes a first processing load;

executing said application in conjunction with said first identity;

gathering a second biometric sample of an individual proximate to said workstation at a second time following said first time by a delay;

establishing a second identity corresponding to said second biometric sample using a second biometric comparison, wherein said second biometric comparison consumes a second processing load which is less than said first processing load; and conditionally continuing to execute said application in conjunction with said first identity if said second identity matches;

wherein said first biometric comparison provides a lower crossover error rate than said second biometric comparison.

17. A method of verifying an identity and a continued presence of an individual at a computer workstation during execution of an application on said computer workstation, said method comprising the steps of:

gathering a first biometric sample of an individual proximate to said workstation at a first time;

establishing a first identity corresponding to said first biometric sample using a first biometric comparison, wherein said first biometric comparison consumes a first processing load;

executing said application in conjunction with said first identity;

gathering a second biometric sample of an individual proximate to said workstation at a second time following said first time by a delay;

establishing a second identity corresponding to said second biometric sample using a second biometric comparison, wherein said second biometric comparison consumes a second processing load which is less than said first processing load; and conditionally continuing to execute said application in conjunction with said first identity if said second identity matches;

wherein said first and second biometric comparisons are based on processing substantially identical physical characteristics of said individual using different processing.

* * * * *